United States Patent
Headley et al.

(10) Patent No.: US 6,769,244 B2
(45) Date of Patent: Aug. 3, 2004

(54) METHOD OF OPERATING A COMBUSTION APPARATUS

(75) Inventors: Ronald Headley, Stourbridge (GB); Patrick Jones, Crewe (GB)

(73) Assignee: Ribbit Limited, Kent (GB)

( * ) Notice: Subject to any disclaimer, the term of this patent is extended or adjusted under 35 U.S.C. 154(b) by 0 days.

(21) Appl. No.: 10/169,271

(22) PCT Filed: Oct. 26, 2001

(86) PCT No.: PCT/GB01/04755

§ 371 (c)(1),
(2), (4) Date: Jun. 25, 2002

(87) PCT Pub. No.: WO02/35078

PCT Pub. Date: May 2, 2002

(65) Prior Publication Data

US 2002/0189245 A1 Dec. 19, 2002

(30) Foreign Application Priority Data

Oct. 28, 2000 (GB) .............................. 0026397

(51) Int. Cl.⁷ .............................................. F01N 3/00
(52) U.S. Cl. ............................ 60/289; 60/274; 60/278; 60/279; 60/288; 60/289; 60/293; 48/127.3; 48/127.7; 48/198.7; 48/198.8; 48/211
(58) Field of Search ................... 60/274, 278, 279, 60/281, 287, 288, 289, 293, 320; 48/127.3, 127.7, 198.1, 198.7, 198.8, 211, 214 A

(56) References Cited

U.S. PATENT DOCUMENTS

| 3,828,736 A | * | 8/1974 | Koch ............................. 123/3 |
| 3,913,322 A | | 10/1975 | Over |
| 3,918,412 A | | 11/1975 | Lindstrom |
| 4,735,186 A | | 4/1988 | Parsons |
| 5,943,859 A | * | 8/1999 | Kawamura ................... 60/320 |
| 6,122,908 A | * | 9/2000 | Wirmark ...................... 60/274 |
| 6,155,212 A | * | 12/2000 | McAlister ....................... 123/3 |
| 6,526,950 B2 | * | 3/2003 | Ito et al. ...................... 123/518 |

FOREIGN PATENT DOCUMENTS

| EP | 0 041 831 | 12/1981 |
| EP | 0 537 968 | 4/1993 |

OTHER PUBLICATIONS

Pierburg: "Sekundarluft Senkt Emissionen" MTZ Motor-technische Zeitschrift, Franckh'sche Verlagshandlung, Abteilung Technik. Stuttgart, DE, vol. 59, No. 12, Dec. 1998, pp. 798–803, XP000799079, ISSN: 0024–8525.

* cited by examiner

*Primary Examiner*—Binh Q. Tran
(74) *Attorney, Agent, or Firm*—MacMillan, Sobanski & Todd, LLC

(57) ABSTRACT

A method of operating a combustion apparatus such as an internal combustion engine is described, in which the apparatus includes at least one combustion chamber with an inlet port for primary combustion air, an apparatus to introduce into the combustion chamber primary fuel for combustion with the primary air, an exhaust port for combustion products, and an exhaust system for exhausting the combustion products to atmosphere, the method including introducing into the exhaust system secondary air, mechanically acting upon the secondary air and products of combustion in the exhaust system in the presence of a catalyst, to produce a reformed fuel, introducing the reformed fuel into the combustion chamber for combustion with primary fuel and primary air.

15 Claims, 3 Drawing Sheets

METHOD OF OPERATING A COMBUSTION APPARATUS

DESCRIPTION OF THE INVENTION

This invention relates to a method of operating a combustion apparatus and more particularly but not exclusively an internal combustion engine e.g. for a vehicle. Such an engine typically includes at least one combustion chamber with an inlet port for primary combustion air, means to introduce into the combustion chamber primary fuel for combustion with the primary air, an outlet port for combustion products, and an exhaust system for exhausting the combustion products to atmosphere. The primary fuel may be petrol, diesel, liquid petroleum gas, for example, or any other suitable fuel or mixture of such fuels.

The development of internal combustion engines has tended to focus on maximising the power output of the engine, achieving economy of fuel use, and the reduction of harmful emissions.

Particularly in the case of achieving reduction of harmful emissions, development has tended to concentrate on improving combustion within the engine for example by developing fuel injection systems which provide for improved fuel/air mixing in combustion chambers of the engine, and then cleaning combustion products, for example by passing the combustion products through catalytic converters for example.

The provision of catalytic converters is problematic because such devices only tend to operate to their maximum performance once very hot, such that during short journeys for example in which engines may not attain an optimum operating temperature, such catalytic converters provide substantially no beneficial effect. Moreover, such converters are expensive and require frequent replacement, as they are easily contaminated.

In previous patent application EP-A-0744006 there is proposed an apparatus for improving combustion, by introducing into the combustion chamber of the engine, a vaporised secondary hydrocarbon based high calorific value fuel, obtained by heating a mineral oil. Thus the efficiency with which the primary fuel is burned in the engine is enhanced, and this has the effect of reducing the production of harmful exhaust emissions.

In previous patent application EP-A-041831 there is described an exhaust aspirator which is adapted to permit the introduction of relatively clean air into an exhaust manifold of the engine to promote more effective exhaust gas discharge and to cause aspirated air to be drawn into a combustion chamber of the engine through an exhaust port thereof, rather than exhaust gases, during cyclic pressure changes which occur in normal engine operation.

According to a first aspect of the invention we provide a method of operating a combustion apparatus which includes at least one combustion chamber with an inlet port for primary combustion air, means to introduce into the combustion chamber primary fuel for combustion with the primary air, an exhaust port for combustion products, and an exhaust system for exhausting the combustion products to atmosphere, the method including introducing into the exhaust system secondary air, mechanically acting upon the secondary air and products of combustion in the exhaust system in the presence of a catalyst, to produce a reformed fuel, introducing the reformed fuel into the combustion chamber for combustion with primary fuel and primary air.

Preferably, the reformed fuel is introduced into the combustion chamber via the exhaust port, e.g. soon after production, but it is envisaged that the reformed fuel may be collected and stored, for later use, and may be fed with the primary fuel into the combustion chamber.

It has been found that by utilising the method of the invention, a substantial improvement in combustion efficiency can be achieved, resulting in much cleaner exhaust emissions and a significant improvement in power output. Also whereas with previous proposals for improved e.g. engine designs, it has been necessary to compromise between fuel efficiency and power output, utilising the present invention, such compromise is unnecessary.

Where the invention is applied to an engine, the method may include introducing the secondary air into the exhaust system via an exhaust aspirator e.g. similar to that disclosed in EP-A-0041831, which draws air into the exhaust system during low pressure or partial vacuum conditions occurring during the cycle of pressure changes which occur in the exhaust system during normal operation of the engine. However whereas in EP-A-0041831, the primary function of the aspirator is to damp down vacuum waves occurring in the exhaust system to improve the efficiency of exhaust gas discharge, in the method of the invention the exhaust aspirator is tuned to draw air into the exhaust system and mechanically to act upon the secondary air and products of combustion by means of pressure pulses, in a manner to optimise reformed fuel production.

Typically, an aspirator means suitable for the purpose of the method of the invention, includes a valve with a spring biased valve member, the force of the spring acting to urge the valve member into engagement with a valve seat to close the valve, and the force of the spring being overcome when sufficiently low pressure is developed in the exhaust system, to allow the secondary air to be drawn in through the valve. Tuning of such an aspirator means for the performance of the invention may involve adjusting the spring pressure so that the valve responds to a desired low pressure or partial vacuum at an appropriate time during the engine cycle, and in a manner to produce strong pressure pulses in the exhaust system adequate mechanically to act upon the combustion products and secondary air present in the exhaust system to produce reformed fuel.

It will be appreciated that in the case of an engine having a single combustion chamber, the spring may be adjusted to open the valve and allow the secondary air to be drawn into the exhaust system at commencement of the piston's induction stroke, when a low pressure is developed in the exhaust system as a result of the (single) piston moving in the combustion chamber to induce air therein through an air inlet port, prior to the exhaust port being completely closed by an exhaust outlet valve or the piston. In a multi-combustion chamber engine, where each piston will be in a different stroke position, the valve may respond to low pressure developed in the exhaust system when one or all of the pistons are at other stroke positions.

It will be appreciated that reference in this specification to primary air being induced into the or each combustion chambers includes air being introduced into the combustion chamber or chambers by e.g. turbo or other primary air introduction means.

The aspirator may be tuned to produce from the secondary air and combustion products, which typically include un-burnt hydrocarbons, nitrous oxide gases (commonly known as "NOx"), carbon dioxide, carbon monoxide and water (usually in the form of steam), reformed fuel including one or both of methanol and hydrogen gas, both of which may satisfactorily provide a supplementary fuel. By operating an engine in accordance with the invention, the amount of un-burnt hydrocarbons, NOx and carbon monoxide in the exhaust gases eventually emitted from the exhaust system to atmosphere has been found to be greatly reduced, and the amount of carbon dioxide produced is significantly reduced Preferably, the catalyst is provided by materials from which the aspirator is at least partly made, such as for example copper, but if desired Cerium may be provided in the vicinity of the aspirator which is particularly good at enhancing secondary fuel production.

Where the apparatus is an engine, the reformed fuel may be introduced into the or each combustion chamber of the engine as a result of a partial vacuum being established at the exhaust port at the end of an exhaust stroke of a piston thereof as the piston commences its next induction stroke, before the exhaust port is completely closed by an exhaust outlet valve or the piston.

Thus the reformed fuel will combust in the combustion chamber simultaneously with the primary air and primary fuel induced or injected into the engine during the next induction phase.

Where the combustion apparatus has a plurality of combustion chambers each having an exhaust port, the exhaust ports may each open to an exhaust manifold, where the aspirator or other means for introducing secondary air into the exhaust system may be located.

The method of the invention may include introducing reformed fuel obtained by mechanically acting upon drawn in secondary air and products of combustion in the exhaust system, into an inlet manifold from where air is introduced into the combustion chamber for combustion with the primary fuel.

This may be achieved by allowing reformed fuel introduced into the combustion chamber via the exhaust port while the exhaust port and inlet ports are both not fully closed, to pass out of the combustion chamber into the inlet manifold for mixing with the air or air/fuel mixture in the inlet manifold, for subsequent introduction into the combustion chamber together with primary and, and induced or injected primary fuel.

In addition to operating the apparatus in accordance with the primary aspect of the invention described above, the method of the invention may additionally include introducing into the combustion chamber of the apparatus, a vaporised secondary hydrocarbon based high calorific value fuel, obtained by heating a mineral oil, for example using an apparatus the subject of EP-A-0744006.

A typical mineral oil may for example conform to British Standard 245.

The mineral oil may be heated electrically and/or by heat exchange with hot exhaust gases produced by the engine.

It has been found that by introducing into the engine or other combustion apparatus a vaporised secondary hydrocarbon based high calorific value fuel to be burnt with the primary fuel and primary air, the engine may be operated at a lower temperature than otherwise, and as a result, the amount of particularly NOx produced during combustion, is minimised.

The combustion apparatus may be an internal combustion engine e.g. an engine in which combustion of fuel in the combustion chamber is initiated by spark, or a Diesel cycle engine in which combustion is initiated by heat caused by the compression of gases in the combustion chamber, or a spark assisted Diesel engine.

In the case of a spark ignition engine the primary fuel may be induced and/or injected into the combustion chamber together with the vaporised secondary hydrocarbon based high calorific value fuel, although where the primary fuel is introduced by injection, the vaporised secondary hydrocarbon based high calorific value fuel may be introduced with the induced air.

In each case performance of the invention has been found to improve the power output of the engine, to achieve improved economy of fuel use, and the reduction of harmful emissions.

According to a second aspect of the invention we provide a method of adapting a combustion apparatus having at least one combustion chamber, for operation in accordance with the first aspect of the invention, the method including providing the combustion apparatus with means to introduce into the exhaust system secondary air, providing means mechanically to act upon the secondary air and products of combustion in the exhaust system in the presence of a catalyst, to produce a reformed fuel, and means to introduce the secondary fuel into the combustion chamber of the apparatus via the exhaust port for combustion with primary fuel and primary air.

Thus the invention readily lends itself to retrofitting to an engine, whereas conventional catalytic converters for example are provided to cleanse exhaust emissions have to be provided as original equipment e.g. by a vehicle manufacturer to ensure that there is space provided to accommodate the converter and to ensure that the converter and engine operate satisfactorily together. However a vehicle may be adapted to perform the invention during manufacture as desired.

Where the engine to be adapted to perform the invention includes a catalytic converter already, depending on the kind of engine control employed, steps may need to be taken to ensure satisfactory operation of the engine. For example where the engine control is so called "open-loop", i.e. an engine management system of the vehicle is operated substantially independently of the performance of the catalytic converter, the method of the second aspect of the invention may be performed without any additional steps being required. However where the engine control is so called "closed-loop" in that an input to the engine management system is provided from a sensor associated with the catalytic converter, the method may include disabling the sensor of the catalytic converter or re-programming the engine management system so that performance of the method of the first aspect of the invention does not detrimentally affect the performance of the engine management system.

It will be appreciated that catalytic converters operate most satisfactorily with a rich fuel/air mixture being burnt in the engine. With a so called "closed-loop" engine management system, the sensor associated with the catalytic converter senses the amount of un-burnt fuel and carbon monoxide, in the combustion products, and the engine management system sets the richness of the primary fuel/air mixture for optimum performance of the catalytic converter. Because utilising the present invention un-burnt hydrocarbons and carbon monoxide are used up in providing reformed fuel, an un-modified closed-loop engine management system would respond to the sensor unduly to increase the richness of the primary fuel/air mixture.

The invention will now be described with reference to the accompanying drawings in which.

Figure 1:
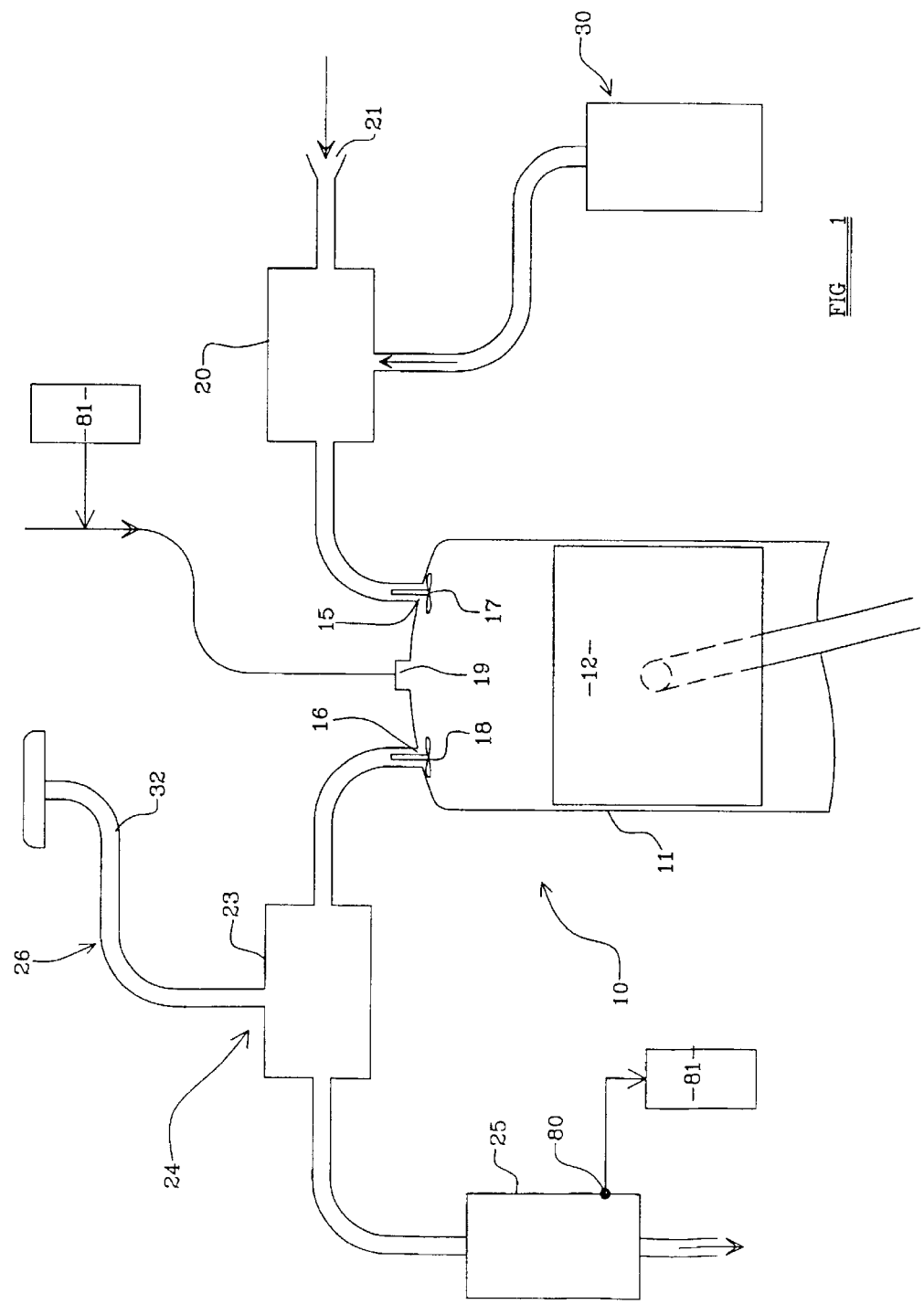
FIG. 1 is a schematic illustration of an engine being operated in accordance with the first and second aspects of the invention.

Referring to FIG. 1, an engine 10 has at least one combustion chamber 11. In this example the engine 10 is of the reciprocating type, in which the combustion chamber 11 is a cylinder in which a piston 12 reciprocates. The invention is however applicable to other kinds of internal combustion engines such as for example rotary engines.

The or each combustion chamber 11 has an inlet port 15 through which, in this example, primary combustion air is introduced, either by simple induction due to piston 12 movement, or with turbo assistance, and an exhaust outlet port 16. Both the inlet and outlet ports 15, 16 in this example are opened and closed by the operation of respective valves 17, 18 which typically are controlled to open and close in accordance with the engine cycle, e.g. by operating rods driven from a camshaft.

In this example, the engine is a Diesel engine in which primary fuel for combustion is injected into the engine by an injector 19, and is ignited as a result of heat generated as air is compressed in the cylinder. In another example, ignition of the primary fuel may be achieved with spark assistance, and particularly in the case of a petrol spark ignition engine, primary fuel may be introduced into the combustion chamber 11 along with the primary air.

The primary air may be introduced into the combustion chamber from an inlet manifold 20. Of course where the engine 10 has a plurality of combustion chambers 11, the inlet ports 15 for each may be connected to the inlet manifold 20. Air is provided to the inlet manifold 20 from an air inlet 21, via air filters etc. as is well known in the art, and/or the air may be provided via a turbo device or otherwise.

The or each exhaust outlet port 16 is connected to an exhaust manifold 23 of an exhaust system 24. Again in the case of a multi-combustion chamber 11 engine, the outlet ports 16 for each combustion chamber 11 may be connected to the exhaust manifold 23. Combustion gases pass, possibly via a catalytic converter 25, from the exhaust manifold, to atmosphere.

In accordance with the invention there is provided a means for introducing secondary air into the exhaust system 24, and in the present case, this is an aspirator device 26 which is described in more detail below with reference to FIG. 2, the aspirator 26 being adapted also to provide for exhaust gases and introduced secondary air in the exhaust system 24, mechanically to be acted upon such that the exhaust gases and secondary air provide a reformed fuel. The reformed fuel is then fed back into the combustion chamber 11 as hereinafter explained, and is subsequently burnt in the combustion chamber 11 along with primary fuel.

It will be appreciated that immediately subsequent to the piston 12 performing an exhaust stroke in the combustion chamber 11, i.e. moving upwardly as seen in the drawings whilst the exhaust outlet port 16 is open, and the piston 12 moves downwardly again to enable at least primary air to be introduced into the combustion chamber 11 with the inlet port 15 open, there will be a short but finite period in which both the inlet 15 and outlet 16 ports will simultaneously be open. During that period, a reduced pressure, or partial vacuum will be established at the outlet port 16 and as a consequence, gases from the exhaust system 24 will be drawn into the combustion chamber 11 along with the primary air from the inlet 15 port. Thus where the exhaust gases include reformed fuel, the reformed fuel will be introduced into the combustion chamber 11.

Moreover, a very small amount of the reformed fuel may pass through the combustion chamber 11 to the inlet port 15, and notwithstanding flow will be predominantly in an opposite direction, a very small amount of the reformed fuel may pass to the inlet manifold 20 for mixing with primary air. Thus the primary air subsequently introduced into the combustion chamber 11 may contain a very small proportion of reformed fuel.

Moreover, in FIG. 1 there is shown an apparatus 30 by means of which a secondary high calorific value vaporised fuel may be introduced into the inlet manifold 20, for introduction with the primary air into the combustion chamber.

Figure 2:
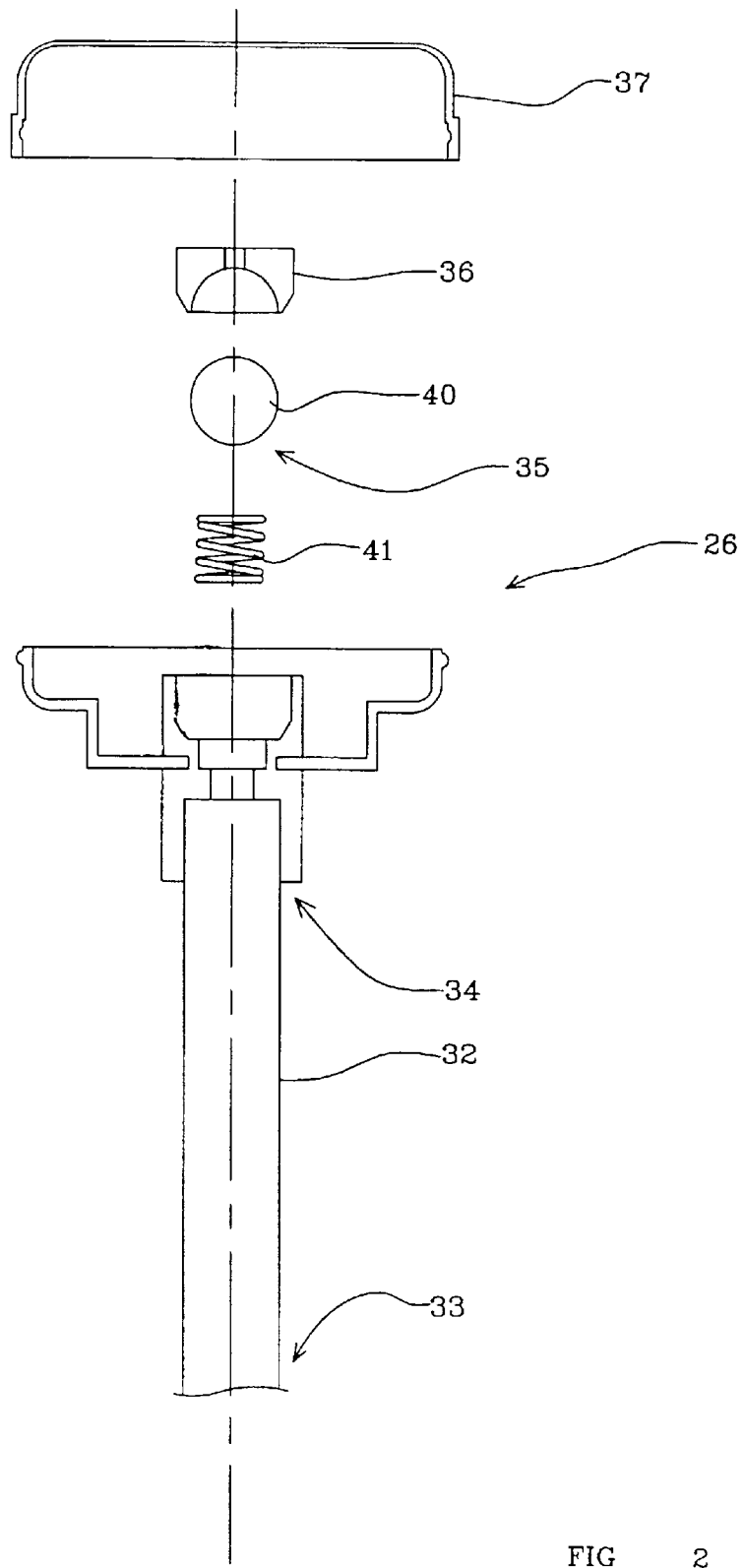
FIG. 2 is an illustrative partly exploded side sectional view of an exhaust aspirator for use in the method of the invention.

Referring now to FIG. 2, an aspirator 26 suitable for allowing secondary air to be introduced into the exhaust system 24 is shown. The aspirator 26 is tuned to maximise reformed fuel production from the secondary air and combustion products.

The aspirator 26 includes a tube 32 which may be provided at one end 33, i.e. the lower end indicated in FIG. 2, with a male threaded boss, to enable the aspirator 26 conveniently to be attached to the outlet manifold 23, but the manifold 23 and aspirator 26 may otherwise be arranged to be connected.

The tube is preferably made of a catalytic material, such as copper, which promotes reformed fuel production, and if desired, Cerium or another higher value but more efficient catalytic material, may be present in the exhaust system 24 further to promote the production of reformed fuel.

At an opposite end 34 of the tube 32, at the top as shown in FIG. 2, there is provided a valve 35. The valve 35 includes a valve seat 36 accommodated in a housing 37 which is in the form of a mushroom shaped cap in this example. A valve member, which in this case is a ball 40, is urged by a spring 41 into engagement with the valve seat 36 which is shaped to receive the ball 40, normally to close the valve and prevent air passing the valve 35 into the tube 32. However the spring 41 is weak, and in the event that a low pressure or partial vacuum is experienced within the tube 32, the force of the spring 41 will be overcome and the ball 40 will be removed from the valve seat 36 so that air may be drawn in through the valve 35, and hence to tube 32 and the exhaust system 24.

The aspirator 26 may be tuned to maximise reformed fuel production by setting the spring 41 pressure so that the valve 35 opens to maximise secondary air inflow at appropriate points in the engine cycle. Moreover, the spring 41 and valve 35 construction generally are adapted so that the secondary air is introduced as strong pulses, with the valve opening and closing sharply. The pulses thus produced, mechanically act upon the combustion products and secondary air in the exhaust system 24 in the presence of the catalytic material, to reform fuel, typically hydrogen gas and methanol, which are introduced as described above into the combustion chamber 11.

Other aspirator 26 constructions are no doubt possible. For example the valve 35 construction may incorporate other than a ball shaped valve member 40, e.g. a disc shaped valve member, with the valve seat 36 being appropriately configured so that the aspirator 26 is tuned to maximise reformed fuel production. In FIG. 1, the tube 32 is shown to be bent, whereas in FIG. 2, the tube 32 is straight. The tube 32 may be bent as desired to fit within an engine compartment of a vehicle.

In a practical embodiment, typically, the tube is about thirty centimeters in length, and typically the valve 35 is about 5 cm in length. The tube 32 diameter is typically about 0.79 cm.

The operation of the aspirator 16 has been described with reference to particularly a single combustion chamber 11 engine 10, in which the low pressure or partial vacuum necessary to cause the valve 35 to open to allow secondary air to be drawn into the exhaust system 24, occurs when the piston 12 is at or substantially at the top of its stroke with the inlet 15 and exhaust ports 16 open. It will be appreciated that in a multi-combustion chamber 11 engine 10, in which all of the pistons 12 will be at different positions in their cycles at any one time, in order to balance the engine 10, the valve 35 of the aspirator 26 may be arranged to open at a time which may not coincide with the piston 12 of any combustion chamber 11 being at the top of its stroke with the inlet 15 and exhaust ports 16 open. In a multi-combustion chamber 11 engine 10, the pressure in the exhaust system 24 will tend to change according to a complex pattern. Nevertheless, the valve 35 of the aspirator 26 may be arranged to open against the force of spring 41 when a set low pressure or partial vacuum is experienced in the exhaust system 24. Thus secondary air/reformed fuel may dwell in the exhaust system 24 but be introduced into the combustion chambers 11 when next a respective piston 12 is at the top of its stroke with the inlet 15 and exhaust ports 16 open. Thus the low pressure or partial vacuum required for the introduction of secondary air into the exhaust system 24 may not coincide with the low pressure or partial vacuum experienced locally of the exhaust outlet ports 16 of the combustion chambers 11 necessary for the reformed fuel to be introduced into the combustion chambers 11.

Figure 3:
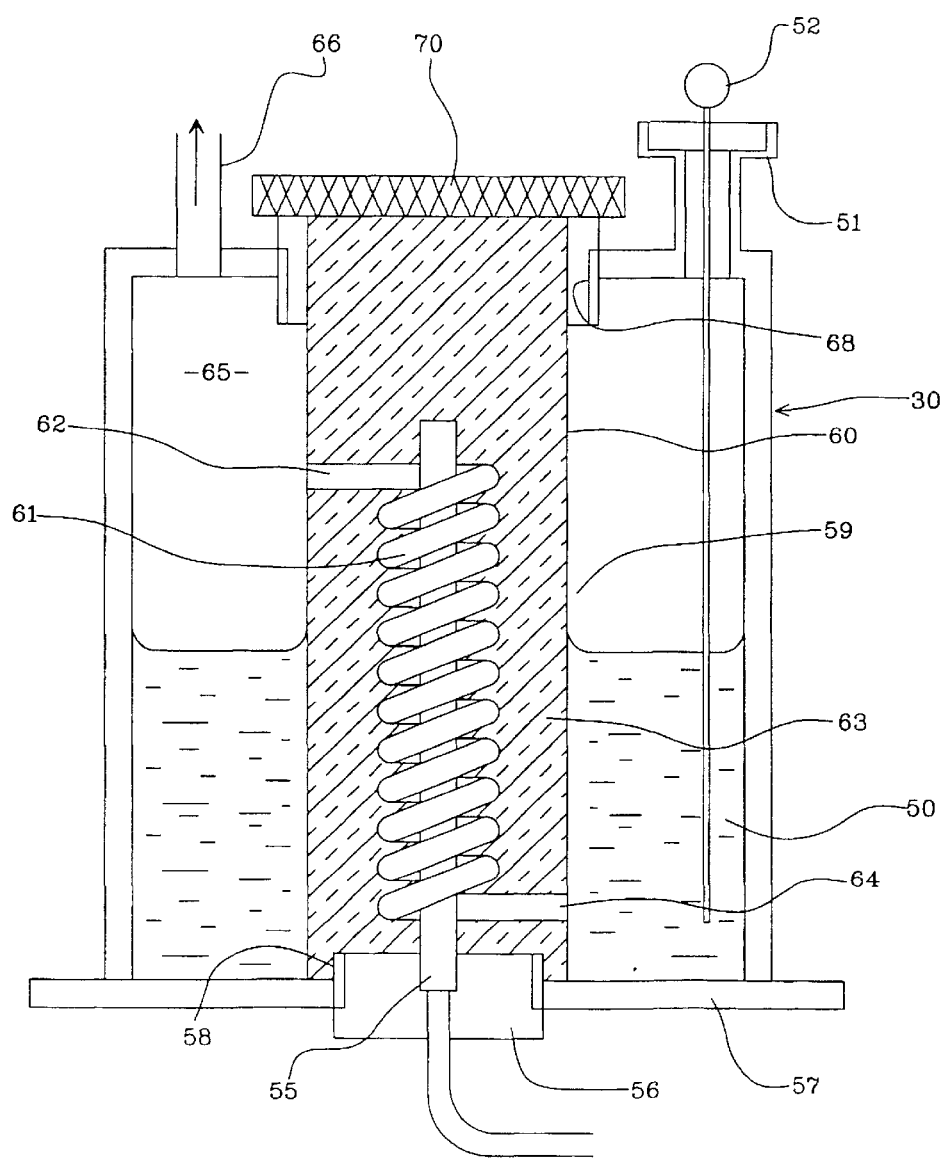
FIG. 3 is an illustrative side sectional view of a secondary fuel apparatus for use in the method of the invention.

Referring now to FIG. 3, there is shown an example of an apparatus 30 by means of which a secondary hydrocarbon based high calorific value vaporised fuel may be introduced into the combustion chamber 11 (or chamber) along with primary air for combustion.

The apparatus 30 includes a reservoir 50 in which there is provided a hydrocarbon based liquid fuel, which conforms to British Standard 245. The container 50 may be filled with liquid fuel via a filler cap 51, and a dipstick 52 may be provided so that the liquid fuel level within the container 50 may readily be determined.

Mounted in the reservoir 50, is an elongate inwardly extending electrical heater element 55, which is mounted via a threaded boss 56. The boss 56 is in threaded and sealing engagement with the container 50, or at least of a bottom wall 57 thereof in this example, and also provides a mounting 58 for a sub-assembly 59. The sub-assembly 59 includes a cylindrical housing 60 in which there is provided a coiled tube 61 which opens through the housing 60 at one end 62 thereof, into a space 65 above the level of the liquid fuel in the container 50, and at a lower end 64, opens through the housing 60 below the liquid fuel level.

When the electrical element 55 is actuated, by passing an electrical current therethrough, liquid fuel in the coiled tube 61 is heated and vaporised. The vaporised fuel passes into the space 65 above the liquid fuel level, and hence through an outlet 66 to the inlet manifold 20 of the engine 10. Thus the vaporised fuel passes with the primary air, into the combustion chamber 11.

Around the coiled tube 61 in the housing 60, there is insulation 63 so that only the liquid fuel in the coiled tube 61 becomes heated. Moreover because the coiled tube 61 is necessarily of small diameter and thus liable to blockage, the sub-assembly 59 is removable form the container 50 by unscrewing from the mounting 58. To seal the sub-assembly 59 with respect to the container 50, the sub-assembly may in use, be also in threaded engagement with the container via a secondary mounting 68, and may include some means, such as a knurled ring 70, to facilitate removal and insertion of the sub-assembly 59 in the container 50.

In another construction of secondary fuel apparatus 50, instead of an electrical heater 55, or in addition thereto, means may be provided to enable the liquid fuel to be heated towards vaporisation, by another heat source, such as for example, hot exhaust gases produced by the engine 10.

It will be appreciated that an existing engine 10 may be adapted to perform the invention by providing an aspirator 26 tuned to reformed fuel production, in the exhaust manifold 23, and if desired by providing a secondary fuel providing apparatus such as apparatus 50 described to work in conjunction therewith.

Where the exhaust system 24 includes a catalytic converter 25, depending on whether this is a passive or active device, when adapting a engine for performance of the present invention, additional steps may need to be performed.

For example, where the catalytic converter 25 includes a sensor 80 which provides an input to an engine management system 81, indicative of the concentration of un-burnt hydrocarbons and carbon monoxide in the exhaust gases, the engine management system conventionally responds by setting the richness of the primary fuel/air mixture to a level where the catalytic converter 25 can operate most efficiently. Where the invention is performed, and the level of un-burnt hydrocarbons and carbon monoxide in the exhaust gases are reduced by the method, the sensor 80 needs to be disabled and/or the engine management system 81 re-programmed to ensure that the richness of the primary fuel/air mixture is not unduly increased.

In an engine in which for example the secondary fuel apparatus 50 is only operated at intervals, the sensor 80 may be used, or another sensor provided, to provide an input to the engine management system 81 in response to particular engine conditions arising to cause the secondary fuel apparatus 50 to operate or not to operate, e.g. by switching the electrical heating element 55 or other heating means on or off.

Various modifications may be made to the apparatus described whilst enabling the methods of the invention to be performed.

For example, in the example described, reformed secondary fuel is introduced into the combination chamber via the exhaust port, for combustion with the primary fuel. Particularly where an excess of reformed fuel is produced, this may be collected and stored, and introduced into the combustion chamber later, e.g. along with the primary fuel rather than via the exhaust port.

The invention is not exclusively applicable to internal combustion engines, but may be applied to other combustion apparatus such as a boiler or furnace having a combustion chamber preferably with an exhaust port through which reformed fuel may be introduced

What is claimed is:

1. A method of operating a combustion apparatus which includes at least one combustion chamber with an inlet port for primary combustion air, apparatus for introducing into the combustion chamber primary fuel for combustion with the primary air, an exhaust port for combustion products, and an exhaust system for exhausting the combustion products to atmosphere, the method including introducing into the exhaust system secondary air, mechanically acting upon the secondary air and products of combustion in the exhaust system in the presence of a catalyst, to produce a reformed fuel, and introducing the reformed fuel into the combustion chamber for combustion with primary fuel and primary air.

2. A method according to claim 1 wherein the reformed fuel is introduced in the combustion chamber via the exhaust port.

3. A method according to claim 1 wherein the combustion apparatus is an internal combustion engine and secondary air is introduced into the exhaust system via an exhaust aspirator which draws air into the exhaust system during low pressure or partial vacuum conditions occurring during the cycle of pressure changes which occur in the exhaust system during normal operation of the engine.

4. A method according to claim 3 wherein the exhaust aspirator is tuned to draw air into the exhaust system and mechanically to act upon the secondary air and products of combustion by means of pressure pulses, in a manner to optimize reformed fuel production.

5. A method according to claim 3 wherein the aspirator includes a valve with a spring biased valve member, the force of the spring acting to urge the valve member into engagement with a valve seat to close the valve, and the force of the spring being overcome when sufficiently low pressure is developed in the exhaust system, to allow the secondary air to be drawn in through the valve and the aspirator being tuned by adjusting the spring pressure so that the valve responds to a desired low pressure or partial vacuum at an appropriate time during the engine cycle, and in a manner to produce strong pressure pulses in the exhaust system adequate mechanically to act upon the combustion products and secondary air present in the exhaust system in the presence of the catalyst, to produce reformed fuel.

6. A method according to claim 1 wherein the reformed fuel includes one or both of methanol and hydrogen gas.

7. A method according to claim 3 wherein the catalyst is provided by materials from which the aspirator is at least partly made.

8. A method according to claim 1 wherein the combustion apparatus is a reciprocating piston engine and the reformed fuel is introduced into the or each combustion chamber of the engine as a result of a partial vacuum being established at the exhaust port at the end of an exhaust stroke of a piston thereof as the piston commences its next induction stroke, before the exhaust port is completely closed by one of an exhaust outlet valve and the piston.

9. A method according to claim 1 wherein the combustion apparatus has a plurality of combustion chambers each having an exhaust port, the exhaust ports each opening to an exhaust manifold, where the apparatus for introducing secondary air into the exhaust system is located.

10. A method according to claim 1 wherein the method includes introducing reformed fuel obtained by mechanically acting upon drawn in secondary air and products of combustion in the exhaust system, into an inlet manifold from where air is introduced into the combustion chamber for combustion with the primary fuel.

11. A method according to claim 1 wherein the method of the invention includes introducing into the combustion chamber of the apparatus, a vaporized secondary hydrocarbon based high calorific value fuel, obtained by one of heating a mineral oil electrically and by heat exchange with hot exhaust gases produced by the apparatus to vaporize the oil.

12. A method according to claim 11 and wherein the combustion apparatus is a spark ignition engine and the primary fuel is one of induced and injected into the combustion chamber together with the vaporized secondary hydrocarbon based high calorific value fuel.

13. A method according to claim 11 wherein the combustion apparatus is an engine is of the kind in which the primary fuel is introduced by an injection apparatus, and vaporized secondary hydrocarbon based high calorific value fuel is introduced with the induced air.

14. A method of adapting a combustion apparatus having at least one combustion chamber an inlet port for primary combustion air, an apparatus for introducing into the combustion chamber primary fuel for combustion with the primary air, an exhaust port for combustion products, and an exhaust system for exhausting the combustion products to atmosphere for operation by a method including introducing into the exhaust system secondary air, mechanically acting upon the secondary air and products of combustion in the exhaust system in the presence of a catalyst, to produce a reformed fuel, and introducing the reformed fuel into the combustion chamber for combustion with primary fuel and primary air, the method of adaptation including providing the combustion apparatus with an apparatus to introduce into the exhaust system secondary air, providing a device mechanically to act upon the secondary air and products of combustion in the exhaust system in the presence of a catalyst, to produce the reformed fuel, and apparatus to introduce the secondary fuel into the combustion chamber via the exhaust port for combustion with primary fuel and primary air.

15. A method according to claim 14 wherein the combustion apparatus is an engine of a vehicle, the vehicle engine of which is to be adapted includes a catalytic converter already and an engine management system thereof is provided with an input from a sensor associated with the catalytic converter which affects engine control, the method including one of disabling the sensor of the catalytic converter and re-programming the engine management system.

* * * * *